United States Patent [19]

Nagano et al.

[11] Patent Number: 5,715,966
[45] Date of Patent: Feb. 10, 1998

[54] SKIN-COVERED LID

[75] Inventors: Akiyoshi Nagano, Aichi-ken; Shigeru Yabuya, Inuyama; Akira Azumi, Kakamigahara; Nobuyoshi Baba, Ichinomiya, all of Japan

[73] Assignee: Toyoda Gosei Co., Ltd., Aichi-ken, Japan

[21] Appl. No.: 623,788

[22] Filed: Mar. 29, 1996

[30] Foreign Application Priority Data

Mar. 31, 1995 [JP] Japan .................... 7-099748

[51] Int. Cl.6 .................... B60N 3/12; B60R 7/06; B65D 43/16
[52] U.S. Cl. .................... 220/339; 220/326; 220/337; 296/37.8
[58] Field of Search .................... 220/339, 213, 220/252, 334, 337, 453, 460, 558, 324, 326; 296/37.8, 37.12

[56] References Cited

U.S. PATENT DOCUMENTS 5,194,194  3/1993  Kato et al. .
5,335,939  8/1994  Kuriyama et al. .

Primary Examiner—Allan N. Shoap
Assistant Examiner—Niki M. Kopsidas
Attorney, Agent, or Firm—Cushman, Darby & Cushman IP Group of Pillsbury, Madison & Sutro LLP

[57] ABSTRACT

A skin covered lid consists of a substrate portion made from resin and a skin layer bonded onto the surface of the substrate portion. The substrate portion has a ceiling portion and side wall portions add also a boss for mounting a lock-plate. The side wall portions have a thickness generally larger than that of the ceiling portion and moreover have hollow portions and also have a hinge portion. The skin layer is fixed with its end portion contacting the side wall portion of the substrate portion.

9 Claims, 5 Drawing Sheets

SKIN-COVERED LID

BACKGROUND OF THE INVENTION

1. Field of the Invention

The present invention relates to a skin-covered lid provided with a synthetic leather material or the like on its surface.

2. Description of Related Art

To close a vehicle console box or the like, a skin-covered lid comprising a substrate portion made of synthetic resin and a skin layer formed on the surface of the substrate portion has been used.

As shown in FIG. 11, the lid 9 is constituted by forming a skin layer 91 on the surface of a substrate portion 92 having a generally U-shaped cross section. An end portion 911 of the skin layer 91 is folded back under the substrate portion 92 and is fixed by post-processing. This fixing is performed by means of tacker fixing, ultrasonic welding, or adhesive.

Moreover, the lid 9 is provided with a hinge mechanism 95 for connecting the lid 9 to the body of a box so that it can be opened or closed. The lid 9 is also provided with a lock plate 19 to keep the lid 9 closed. The hinge mechanism 95 includes a base portion 952 connected to the substrate portion 92, a setting portion 950 connected to the box body, and an integral hinge portion 951.

The hinge mechanism 95 and the lock plate 19 are manufactured separately from the lid 9, and are connected to the lid 9 with six metallic screws 190.

In FIG. 11, numeral 98 represents a boss for fixing the metallic screws 190. Numeral 115 represents a polyvinyl chloride sheet of the skin layer 91. Numeral 116 represents a polyurethane foam layer of the skin layer 91.

However, the lid 9 has the following problems.

The first problem is that the lid 9 comprises a lot of parts such as the skin layer 91, substrate portion 92, hinge mechanism 95, and lock plate 19. In addition, it takes an increased amount of time to manufacture those parts.

The second problem is that the weight of the lid 9 increases because many metallic screws 190 are used to fix the hinge mechanism 95 and lock plate 19.

The third problem is that the manufacturing cost increases because the lid 9 uses many parts. Therefore, the number of manufacturing processes increases to assemble the lid 9.

The fourth problem is that it is necessary to fix the end portion 911 of the skin layer 91 to the substrate portion 92 in a process separate from the process for forming the lid 9. This further increases the time to manufacture the lid 9.

SUMMARY OF THE INVENTION

The present invention is made to solve the above problems and to provide a lightweight, skin-covered lid in which skin end portion processing is unnecessary. The lid is easily manufactured, and its manufacturing cost is low.

According to the present invention, a lid for a storage compartment, such as the center console of an automobile interior, includes a skin layer which is bonded a substrate which is made from resin, for example, so as to eliminate the need for after-processing (for example, for adhering, tacking, or welding the skin layer to the substrate). According to the present invention, the skin layer is bonded securely to the substrate portion at the time the substrate portion is molded. As a result, one aspect of the lid according to the present invention includes embedding a part of the skin layer in the resin substrate portion when the substrate portion is molded, thereby further securing the skin layer is not need.

Also, according to the present invention, a mounting boss for mounting a locking plate is preferably provided in the substrate portion, along with a reinforcing rib, respectively, which increases the strength of that part of the lid.

A hinge mechanism is provided which is preferably integral with the substrate portion. This reduces the weight of the lid by eliminating the need for a mounting boss as associated attachment fixtures, such as metal screws, as in the conventional art.

Because the overall number of parts in the lid according to the present invention is reduced, the lid can be later easily separated into constituent parts (for example, resinous and metallic) for the purpose of recycling, for example.

PREFERRED EMBODIMENTS OF THE INVENTION

The skin-covered lid of a first embodiment of the present invention is described below, with reference to FIGS. 1 to 5 and 7.

Figure 1:
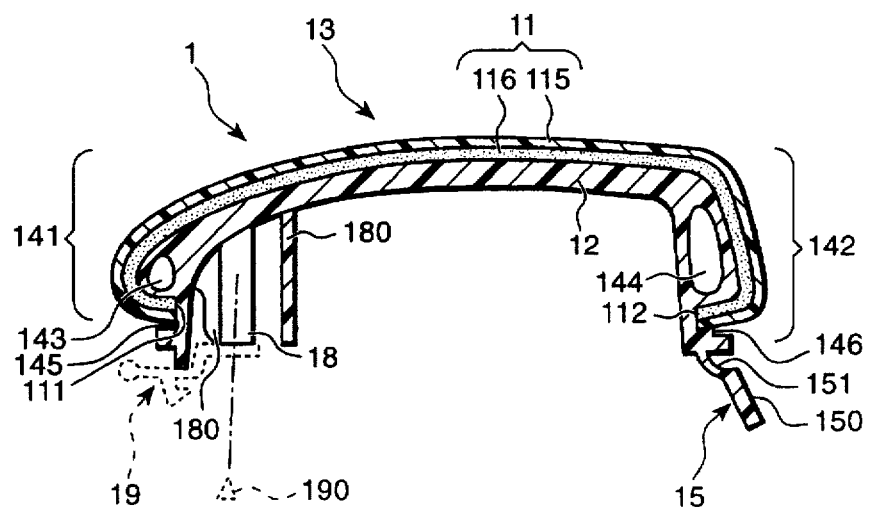
FIG. 1 is a cross-sectional view of the skin-covered lid of a first embodiment of the present invention.

As shown in FIG. 1, the skin-covered lid 1 of this embodiment is made by integrally forming a substrate portion 12 made of synthetic resin and a skin layer 11 on the surface of the substrate portion 12.

The substrate portion 12 has a ceiling portion 13 and side wall portions 141 and 142. The side wall portions 141 and 142 each have an overall thickness generally larger than that of the ceiling portion 13 and hollow portions 143 and 144.

Moreover, the side wall portion 142 has a hinge portion 15. The substrate portion 12 has two setting bosses 18 and a lock-plate 19.

As shown in FIGS., 4 and 5, the skin layer 11 is fixed with one end portion 111 contacting the side wall portion 141 at the boss 18 side of the substrate portion 12. Another end portion 112 of the skin layer 11 is inserted into the side wall portion 142 at the hinge portion 15 side of the substrate portion 12 and is fixed thereto.

The two types of fixed states of the end portions 111 and 112 are described by way of example. On the other hand, for example, end portion 111 could be insertingly fixed and end portion 112 could be contactingly fixed.

The skin layer 11 comprises an external sheet 115 and a foamed layer 116 provided under the external sheet 115.

Figure 2:
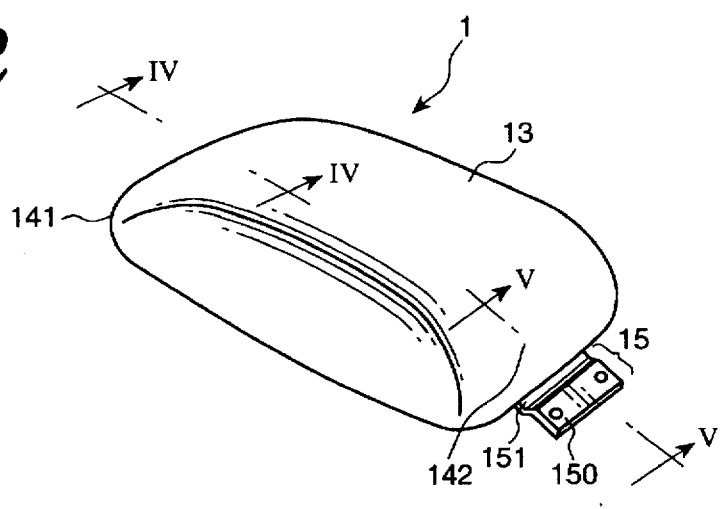
FIG. 2 is a perspective view of the skin-covered lid of the first embodiment.
Figure 3:
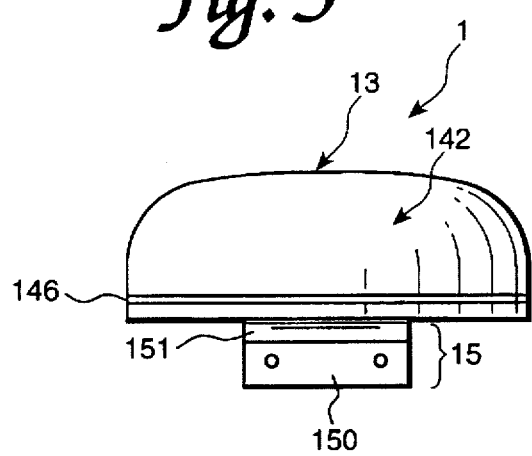
FIG. 3 is an end view of the skin-covered lid of the first embodiment 1.
Figure 4:
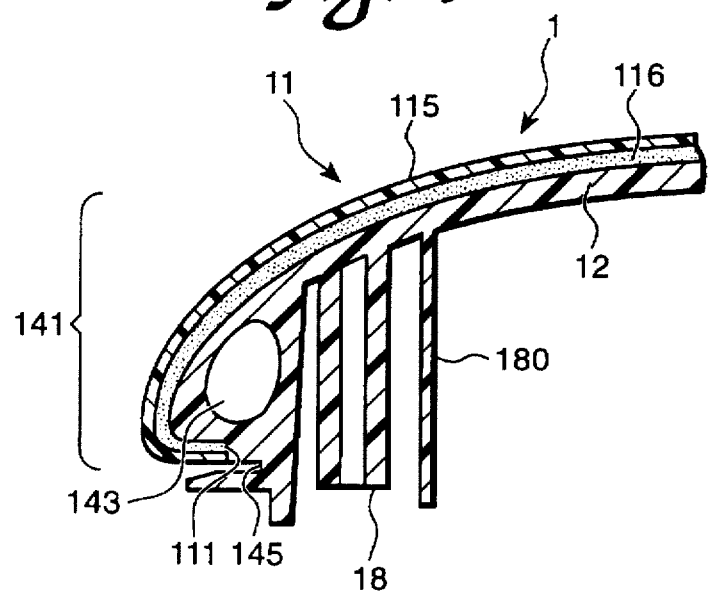
FIG. 4 is an enlarged, partial cross-sectional view of the skin-covered lid, taken along the line IV—IV in FIG. 2.
Figure 5:
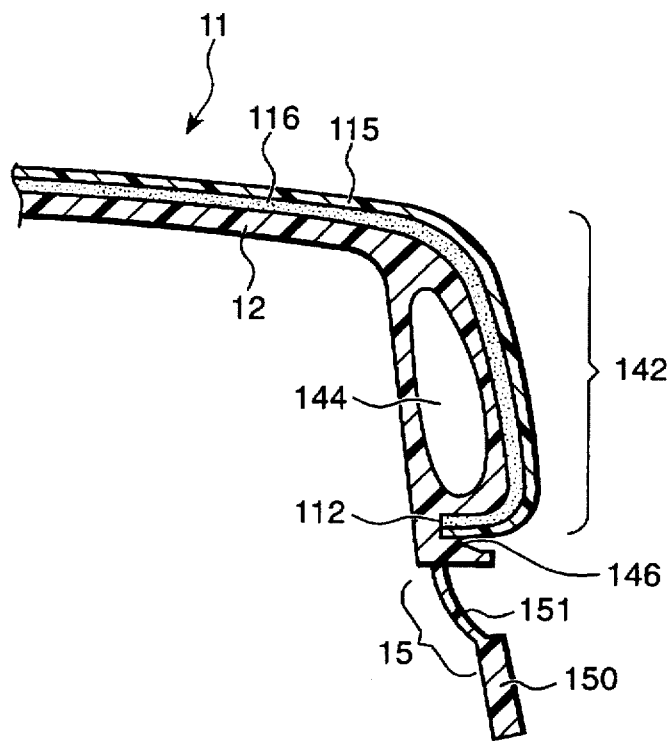
FIG. 5 is an enlarged, partial cross-sectional view of the skin-covered lid, taken along the like V—V in FIG. 2.

As shown in FIGS. 1 to 3, the hinge portion 15 has an integral hinge portion 151 and a setting portion 150 which are integral with the substrate portion 12 on the side wall portion 142.

Figure 7:
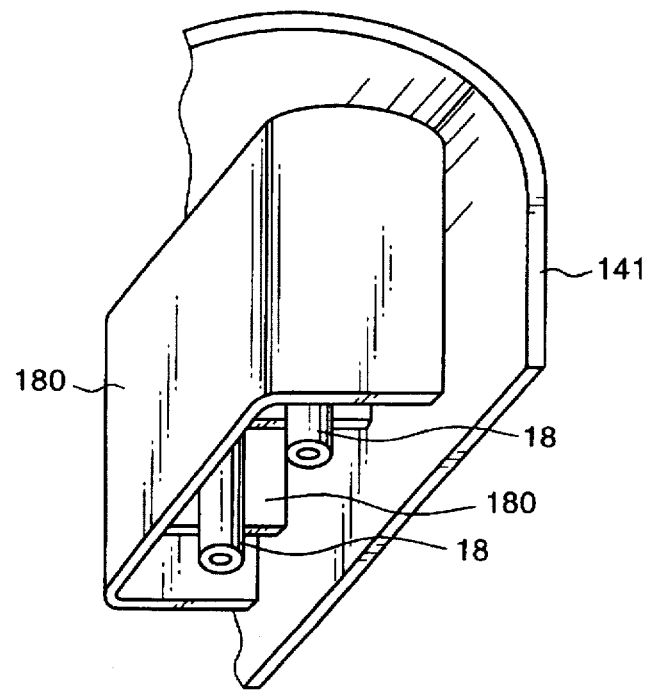
FIG. 7 is an enlarged perspective view of the back of the skin-covered lid of the first embodiment, near the boss.

As shown in FIG. 7, the boss 18 has a reinforcing rib 180 therearound integrally formed with the substrate portion 12. Moreover, the lock-plate 19 is secured to the boss 18 by, for example, two screws 190, as shown in FIG. 1.

Cross sections (IV—IV and V—V cross sections in FIG. 2) related to the directions of the hinge portion 15 and the boss 18 are mainly described above. Also in the direction perpendicular to the above directions, a cross section same as the case of the hinge portion side (the hinge portion 15 has no cross section) is formed.

In FIG. 1, numerals 145 and 146 represent clearances or spaces between the surface of the external sheet 115 and the opposite face of the substrate portion 12.

Figure 6:
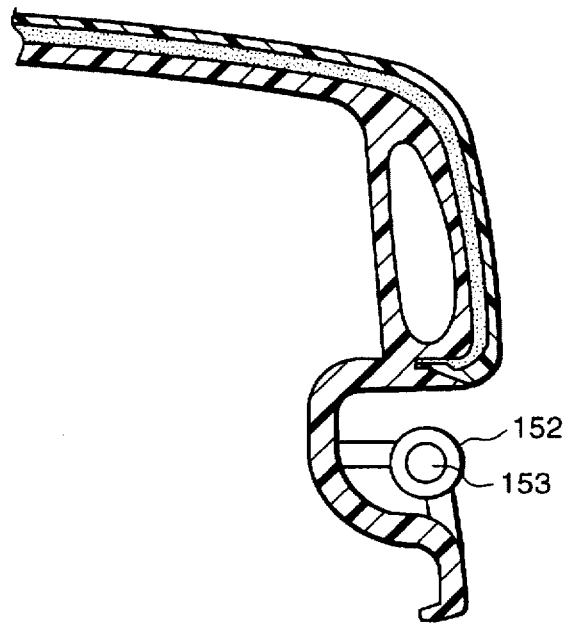
FIG. 6 is an enlarged, partial cross-sectional view of the skin-covered lid of a second embodiment.

The second embodiment, shown in FIG. 6, has an arch hinge 152 instead of the integral hinge portion 151 in the hinge portion 15 in the first embodiment. The second embodiment also has a pivot portion 153.

Functions and advantages of the above-mentioned first and second embodiments are described below.

The skin-covered lid is constituted by integrally forming the skin layer 11, substrate portion 12, hinge portion 15, and boss 18 and mounting the lock plate 19 on the boss 18 provided on the substrate portion 12.

The skin-covered lid 1 uses only a relatively small number of parts. Therefore, only a small number of processes for assembling the lid 1 are required. Accordingly, the skin-covered lid 1 is easily manufactured and its manufacturing cost is relatively low.

Moreover, because only a small number of parts are used as described above, it is possible to easily disassemble the skin-covered lid 1 into parts made of resin (e.g. the skin layer 11 and the substrate portion 12) and parts made of metal (e.g. the lock plate 19 and the screws 190).

Therefore, the skin-covered lid 1 of these embodiments can easily be recycled later.

Moreover, because the skin-covered lid 1 is integrally formed as described above, only two screws are used to secure the lock plate 19. Furthermore, the side wall portions 141 and 142 have hollow portions 143 and 144 which are made by gas injection molding method described in the U.S. Pat. No. 4,968,474. Therefore, the skin-covered lid is lightweight.

Furthermore, the rigidity of the skin-covered lid 1 is improved by the hollow portions 143 and 144.

Also, the end portions 111 and 112 of the skin layer 11 of the skin-covered lid 1 are fixed while contacting the side wall portions 141 and 142 of the substrate portion 12.

Thereby, separate processing to fold back or fix of the end portions 111 and 112, as in the prior art, is unnecessary.

Moreover, the boss 18 has an integrally-formed reinforcing rib 180. Therefore, the boss 18 has advantageously high strength.

Another advantage is that it is possible to prevent the skin layer 11 from delaminating because the end portion 112 at the hinge portion 15 side is completely held in the side wall portion 142.

Also, because the skin layer 11 comprises an external sheet 115 and a foamed layer 116, it is possible to obtain the skin-covered lid 1 whose surface is elastic and pleasant to the touch.

Therefore, these embodiments make it possible to provide a lightweight skin-covered lid in which skin layer end portion processing is unnecessary, which is easily manufactured, and whose manufacturing cost is low.

Moreover, the arch hinge 152 in FIG. 6 can be made stronger than an integral hinge.

Figure 8:
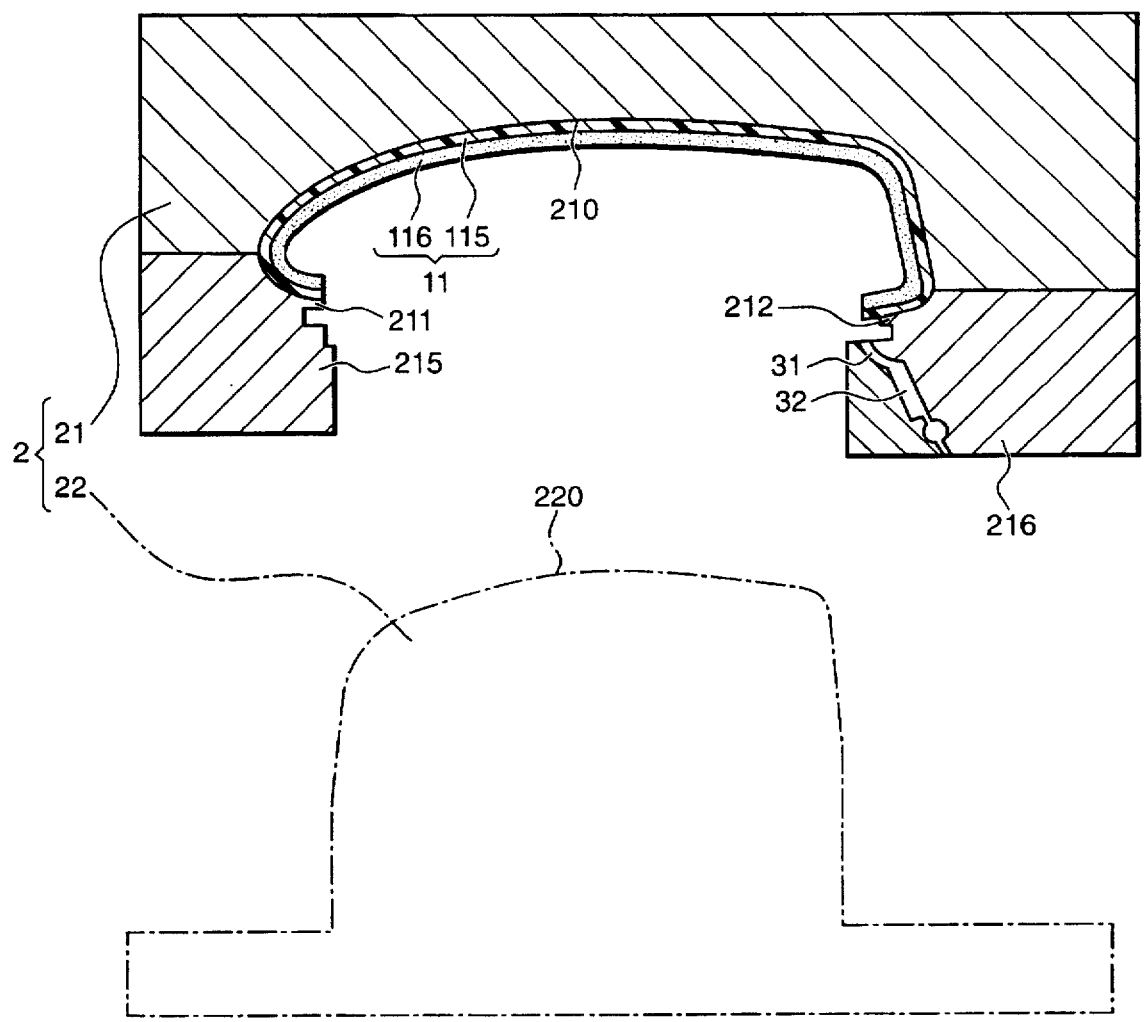
FIG. 8 is an illustration of a forming die for forming the skin-covered lid of a third embodiment.
Figure 9:
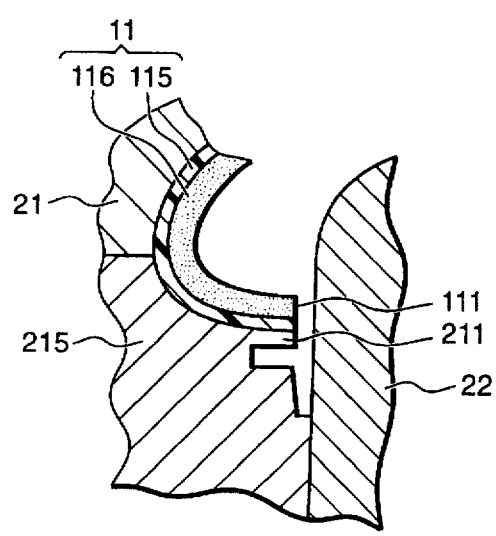
FIG. 9 is an illustration of a portion of a forming die to which the skin of the third embodiment is set.
Figure 10:
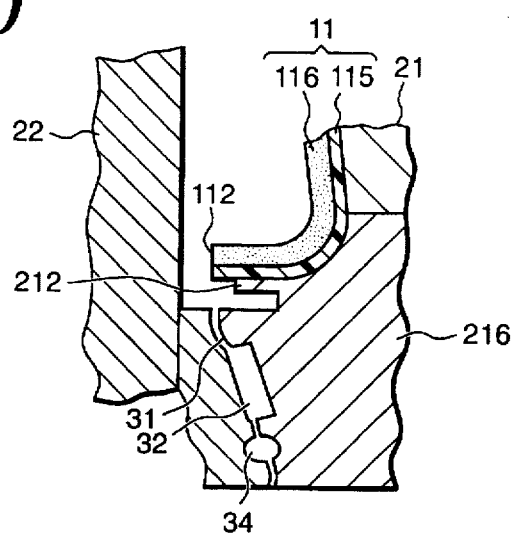
FIG. 10 is another illustration of a portion of a forming die to which the skin of the third embodiment is set.
Figure 11:
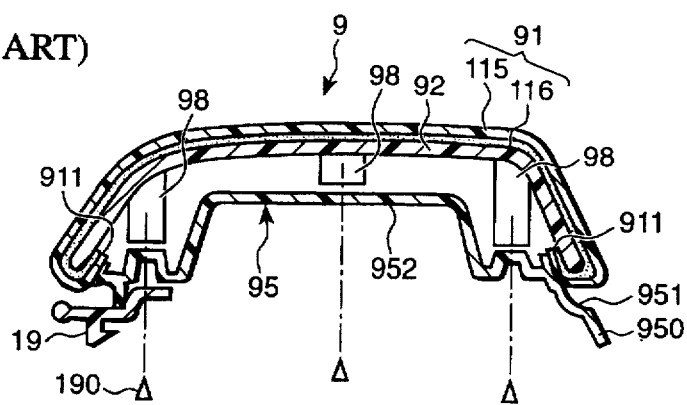
FIG. 11 is a cross-sectional view of a conventional skin-covered lid.

The method for forming the skin-covered lid 1 of the first embodiment is now described, with reference to FIGS. 8 to 10.

The skin-covered lid 1 is formed by using a forming die 2. As shown in FIG. 8, the forming die 2 comprises an upper segment 21 and a lower segment 22 (schematic view). The upper segment 21 has an interior concave surface 210.

The lower segment 22 has a convex surface 220 which is shaped to form the inside of the substrate portion 12 of the skin-covered lid 1. Moreover, as shown in FIGS. 9 and 10, separable slide cores 215 and 216 are provided on the bottom margin of the upper segment 21.

The slide core 216 has cavities 31 and 32 shaped to form the integral hinge 151 and setting portion 150 and also has a tab 34 which is shaped so as to accelerate the flow rate of resin at its front end portion (see FIG. 10). The cavities 31 and 32 and the tab 34 are formed by divided mold segments.

To manufacture the skin-covered lid 1 by using the forming die 2, the skin layer 11, comprising, for example, a polyvinyl-chloride sheet 115 and a polyuretane foam layer 116 is first arranged on the surface 210 of the upper segment 21 as shown in FIG. 8.

As shown in FIG. 9, one end portion 111 of the skin layer 11 is supported by a support portion 211 disposed on the bottom margin of the upper segment 21.

As shown in FIG. 10, the other end portion 112 is supported by a support portion 212 and arranged so that the front end of the end portion 112 protrudes beyond the front end of support portion 212.

Then, a molten resin is poured onto the surface of the lower segment 22. The upper segment 21 is then lowered onto the lower segment 22 to press the molten resin.

Next, a pressurized gas is injected into a part of the molten resin to form the hollow portions 143 and 144 of the substrate portion 12 through a gas hole provided in the lower segment 22.

Accordingly, the molten resin of the substrate portion 12 inflates while forming hollow portions 143 and 144 (see FIG. 1) in the resin, and presses the skin layer 11 against under surface of the upper segment 21. Thus, the substrate portion 12 is obtained.

In this case, because the molten resin is pressed against the end portion 111 of the skin layer 11, both are fixed. Also, the end portion 112 of the skin layer 11, which protrudes past the end of support portion 212, becomes surrounded by the molten resin and is thereby fixed in place once the resin hardens therearound.

Thereafter, by taking the cooled resin out of the forming die 2, the integrally-formed skin-covered lid 1 of the first embodiment is obtained.

The clearances 145 and 146 of the skin-covered lid 1 are defined by the support portions 211 and 212.

The above manufacturing method makes it possible to obtain a lightweight skin-covered lid whose skin layer end portion processing is unnecessary, which is easily manufactured, and whose manufacturing cost is low.

What is claimed is:

1. A lid for a storage compartment comprising:

a resinous substrate portion comprising a center portion, opposing side wall portions, one of said opposing side walls terminating with an integrally molded, hinge defining an open portion directed outwardly from said one opposing side wall, said open portion including a connection member;

a skin layer bonded to said substrate portion such that said skin layer contacts said opposing side wall portions; and a boss portion integrally formed with said substrate portion, said boss portion including a reinforcing member extending at least partially therearound and being integrally formed with said substrate portion, said boss portion having a locking plate mounted thereon, said substrate portion further including a molded and enclosed hollow portion provided at least at one of said opposing side walls, said hollow portion having a shape corresponding to said at least one of said opposing side walls to assure proper molding of said at least one of said opposing side walls.

2. The lid according to claim 1, wherein said hinge mechanism includes an arch shaped hinge member.

3. The lid according to claim 1, wherein said skin layer comprises an exterior layer and a sublayer.

4. The lid according to claim 3, wherein said exterior layer is made from a vinyl material.

5. The lid according to claim 3, wherein said sublayer is made from a foam material.

6. The lid according to claim 1, wherein an end portion of said skin layer is embedded within a part of a said substrate portion.

7. A lid as in claim 1 including a hollow portion within each of said opposing side walls.

8. A lid as in claim 7, wherein said hollow portion extends in a direction along said opposing side walls.

9. A lid as in claim 1, wherein said connection portion includes an arched segment and said connection member further includes a pivot forming structure secured within said arched segment.

* * * * *